No. 850,399. PATENTED APR. 16, 1907.
G. T. REISS.
JOURNAL BEARING.
APPLICATION FILED FEB. 28, 1907.
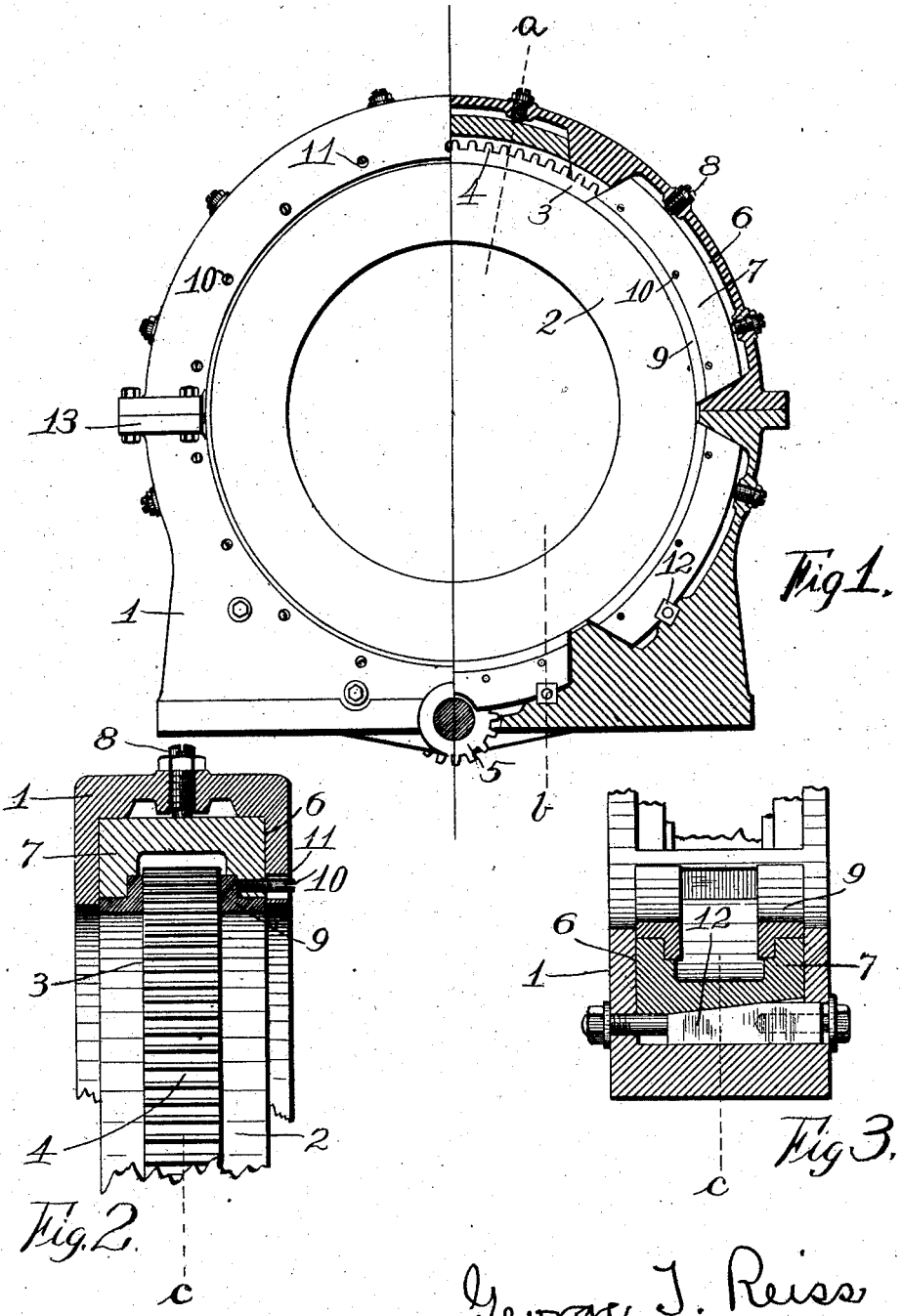
Witnesses:
Elmer R. Shipley.
M. S. Belden.
George T. Reiss
Inventor
by James W. See
Attorney United States Patent Office.

GEORGE T. REISS, OF HAMILTON, OHIO, ASSIGNOR TO NILES-BEMENT-POND COMPANY, OF JERSEY CITY, NEW JERSEY.

JOURNAL-BEARING.

No. 850,399.　　　Specification of Letters Patent.　　Patented April 16, 1907.

Application filed February 28, 1907. Serial No. 359,711.

*To all whom it may concern:*

Be it known that I, GEORGE T. REISS, a citizen of the United States, residing at Hamilton, Butler county, Ohio, have invented certain new and useful Improvements in Journal-Bearings, of which the following is a specification.

In machine construction there sometimes arise conditions calling for a journal and bearing of large diameter and little width or length and requiring a maintained closeness of fit. For instance, in a certain class of lathes there is a chuck in open-ring form, the outside of the chuck forming a journal running in a bearing, the construction being such that work held in the chuck may be operated upon by tools located on either side of the machine. The running journal under such circumstances requires to be maintained in as close a condition of fitting as is called for in the case of any ordinary lathe-spindle, while the conditions making for disturbing wear are particularly aggravating.

My invention relates to improvements in journal-bearings of this kind and will be readily understood from the following description, taken in connection with the accompanying drawings, in which—

Figure 1 is a face elevation, part vertical section, in the plane of line *c* of Figs. 2 and 3, of a journal-bearing embodying my invention; Fig. 2, a vertical section through a portion of the same in the plane of line *a* of Fig. 1, and Fig. 3 a vertical section in the plane of line *b* of Fig. 1.

In the drawings, 1 indicates the general bearing in the form of a large and comparatively narrow ring provided with a base; 2, the narrow journal which is to rotate in the bearing, this journal to be, in the example above referred to, the open center chuck which is to rotate in the bearing, the main peripheral portions of this journal forming the running surfaces of the journal; 3, a circumferential rib formed upon the periphery of the journal, the sides of this rib in the present case forming the end-thrust surfaces of the journal; 4, teeth formed on the periphery of the journal-rib to permit the journal to be rotated in the bearing; 5, a pinion mounted in the bearing and engaging the teeth of the journal, this pinion constituting the driver of the system; 6, a circumferential series of pockets in the interior surface of the bearing 1, these pockets having a width substantially equal to that of the journal and having their sides parallel with each other and having their ends parallel with each other; 7, a block fitted in each of the pockets, the ends of these blocks fitting the end walls of the pockets and the sides of the blocks fitting the side walls of the pockets, so that the blocks will be snugly held in the pockets and be capable of radial adjustment therein, the end walls of the pockets being parallel, not only with each other, but with a line radial to the journal, the inner faces of these blocks being longitudinally grooved to make room for the rib and teeth projecting from the periphery of the journal; 8, adjusting devices in the form of screws projecting inwardly through the outer walls of the pockets, the inner ends of these screws bearing against the outer surfaces of the blocks and their outer ends being accessible for adjustment exterior to the bearing, the screws being provided with lock-nuts for securing them after adjustment; 9, a pair of liners, L-shaped in cross-section, for each of the blocks, the inner sides and inner segmental faces of these liners being adapted to fit the peripheral surfaces of the journal and the side faces of the rib thereon, one of the liners in each block being adapted for adjustment in the block in a direction parallel with the axis of the journal; 10, adjusting-screws threaded through one of the side walls of each block, their inner ends impinging inwardly against the adjustable liner of the block, the outer ends of these screws being in position to be accessible at the exterior of the side of the bearing; 11, a hole in the flange of the bearing at each of the screws 10, these holes being of such size as to permit a proper degree of radial movement for the screws as the blocks are adjusted radially; 12, a circular series of wedges seated in the base portion of the bearing and across the same and engaging against the outer portion of the blocks seated in the base portions of the bearing, these wedges being provided with end screws, by means of which they may be adjusted endwise, so as to adjust their blocks radially, and 13 a diametrical joint of separation in the bearing between the base and cap after the usual manner of capped bearings.

As the circular surfaces of the journal and liners wear away this wear may be compensated for by adjusting the blocks inwardly by means of screws 8. As end wear takes place between the inner side surfaces of the liners and the outer surfaces of the journal-surface of the journal-rib this wear will be compensated for by adjusting a liner of each block inwardly sidewise by means of the screws 10. It will be manifest that while the liner thus adjusted inwardly sidewise to take up end wear must be movable relative to the block the liner at the other side of the journal-rib does not require to be movable or even to be in the form of a separable liner, though good construction would generally dictate that in this device the actual wearing-surfaces of the journal be in the form of liners of better wearing material than is employed for the comparatively large blocks.

In the upper portions of the structure there is no trouble in getting access to the adjusting-screws 8; but at the base of the structure adjusting-screws of the type illustrated at 8 would not be practicable. Hence recourse is had to the wedges 12 at points where screws 8 are not feasible, these wedges permitting of radial adjustment of their blocks by a movement of the wedges parallel with the axis of the journal.

I claim as my invention—

1. A journal-bearing comprising a ring-shaped bearing having a circumferential series of internal pockets, a segmental block fitted in each pocket and adapted for radial adjustment therein and having its inner face longitudinally grooved, adjusting devices acting between the outer walls of the pockets and the outer surfaces of the blocks and serving to adjust the blocks radially, a liner carried by one side of each block and adapted for inward sidewise movement relative to the block, screws carried by the blocks and engaging said liners and serving to adjust said liners inwardly sidewise, and a journal disposed within said bearing and having a peripheral journal-surface engaging said liners and having a peripheral rib with one of its sides engaged by the inner side surface of said liners and with its other side engaged by suitable bearing-surfaces carried by the blocks, combined substantially as set forth.

2. A journal-bearing comprising a ring-shaped bearing having a circumferential series of internal pockets, a segmental block fitted in each pocket and adapted for radial adjustment therein and having its inner face longitudinally grooved, screws threaded through the outer walls of the pockets and impinging against the outer surfaces of the blocks and serving to adjust the blocks radially, a liner carried by one side of each block and adapted for inward sidewise movement relative to the block, screws carried by the blocks and engaging said liners and serving to adjust said liners inwardly sidewise, and a journal disposed within said bearing and having a peripheral journal-surface engaging said liners and having a peripheral rib with one of its sides engaged by the inner side surface of said liners and with its other side engaged by suitable bearing-surfaces carried by the blocks, combined substantially as set forth.

3. A journal-bearing comprising a ring-shaped bearing having a base and provided with circumferential series of internal pockets, a segmental block fitted in each pocket and adapted for radial adjustment therein and having its inner face longitudinally grooved, screws threaded through the exterior wall of some of the pockets and having their inner ends impinging upon the outer surfaces of the blocks, wedges disposed across some of the pockets and engaging between the outer walls of the pockets and the outer surfaces of the blocks and provided at their ends with screws exterior to the sides of the bearing for moving the wedges endwise, a liner carried by one side of each block and adapted for inward sidewise movement relative to the block, screws carried by the blocks and engaging said liners and serving to adjust said liners inwardly sidewise, and a journal disposed within said bearing and having a peripheral journal-surface engaging said liners and having a peripheral rib with one of its sides engaged by the inner side surface of said liners and with its other side engaged by suitable bearing-surfaces carried by the blocks, combined substantially as set forth.

GEORGE T. REISS.

Witnesses:
M. A. BELDEN,
ELMER R. SHIPLEY.